United States Patent
Davies et al.

(10) Patent No.: US 7,266,714 B2
(45) Date of Patent: Sep. 4, 2007

(54) METHOD AN APPARATUS FOR ADJUSTING THE TIME OF A CLOCK IF IT IS DETERMINED THAT THE DEGREE OF ADJUSTMENT IS WITHIN A LIMIT BASED ON THE CLOCKS INITIAL TIME

(75) Inventors: Trevor Davies, Walnut Creek, CA (US); John David Couling, Wootton Bassett (GB)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 334 days.

(21) Appl. No.: 10/869,460

(22) Filed: Jun. 15, 2004

(65) Prior Publication Data

US 2005/0276167 A1    Dec. 15, 2005

(51) Int. Cl.
*G06F 1/00* (2006.01)
*G06F 11/00* (2006.01)
*G11C 7/00* (2006.01)

(52) U.S. Cl. .......................... 713/500; 726/21; 726/26; 726/27

(58) Field of Classification Search ................ 713/400, 713/500, 503; 726/26, 21, 27
See application file for complete search history.

(56) References Cited

U.S. PATENT DOCUMENTS 4,602,375 A * 7/1986 Inukai ........................ 375/358
5,500,897 A    3/1996 Hartman, Jr.
5,826,066 A * 10/1998 Jardine et al. .............. 713/400
5,999,921 A   12/1999 Arsenault et al.
6,708,281 B1   3/2004 Walsh
7,065,679 B2 * 6/2006 Nakamura et al. ............ 714/47
2002/0042884 A1   4/2002 Wu et al.
2003/0233553 A1  12/2003 Parks et al.
2004/0083487 A1   4/2004 Collens et al.
2005/0097260 A1 * 5/2005 McGovern et al. ......... 711/100

FOREIGN PATENT DOCUMENTS

EP    1 229 424 A2    8/2002

OTHER PUBLICATIONS

Farrow, Rik, "Beating the Clock on Security," Network Magazine, Sep. 5, 2001.
Microsoft Corporation, "A Technical Overview of Next Generation Windows Media DRM for Devices," Apr. 2004.
Cohen, Josh, Microsoft Corporation, "A General Overview of Two New Technologies for Playing Protected Content on Portable or Networked Devices," Jun. 2004.

* cited by examiner

*Primary Examiner*—Thomas Lee
*Assistant Examiner*—Mark Connolly
(74) *Attorney, Agent, or Firm*—Gallagher & Lathrop; Thomas A. Gallagher

(57) ABSTRACT

A free-running secure clock in a computing device that is adjustable by a user of the device so long as cumulative adjustments do not exceed a predicted clock drift. The clock may be initially set by the user or by a trusted time authority or the like. Such a clock may be required in a trust-based system that measures a temporal requirement against the clock.

16 Claims, 2 Drawing Sheets ized such a request if the degree of requested adjustment summed with prior adjustments, if any, is within the limit.

METHOD AN APPARATUS FOR ADJUSTING THE TIME OF A CLOCK IF IT IS DETERMINED THAT THE DEGREE OF ADJUSTMENT IS WITHIN A LIMIT BASED ON THE CLOCKS INITIAL TIME

TECHNICAL FIELD

The present invention relates to a free-running secure clock in a computing device that is adjustable by a user of the device so long as cumulative adjustments do not exceed a predicted clock drift. The clock may be initially set by the user or by a trusted time authority or the like. Such a clock may be required in a trust-based system that measures a temporal requirement against the clock.

BACKGROUND OF THE INVENTION

Many devices that incorporate a trust-based system that enforces Digital Rights Management (DRM), such as computing devices, including digital content reproduction devices and the like, have a temporal or time-based access requirement that requires a clock. While such a clock may, in principle, be located anywhere, it is often convenient for the device to incorporate a clock, a local source of time against which rights are validated. For example, playback of audio or video content may be permitted during one or more defined time periods and not at other times. The clock must be accurate so that permissions are granted only when they should be. The clock must also be secure so that a user cannot easily defeat the DRM by setting the current time to a false time within a permitted time window. There are a variety of schemes currently used for maintaining accuracy while maintaining security. For example, some systems lock an internal clock to a Global Positioning Satellite (GPS) receiver so that the clock does not drift. Other systems lock an internal clock to a Network Time Protocol (NTP) server on the Internet using secure network transactions. However, in some circumstances, either no connection to an external source is feasible or a continuous connection to such a source is not feasible. For example, no Internet connection may be available or GPS signals may not be receivable. If no external source is available, then a free-running clock has to be used. However, a free-running clock suffers from drift, and adjustment may be necessary in order to maintain accuracy. Consequently, there is a need for a secure clock that is free running but which may be adjusted by a user to correct for drift without compromising the clock's security.

SUMMARY OF THE INVENTION

According to an aspect of the invention, a method of operating a free-running secure clock in a computing device is provided, wherein the clock has been initially set to a time, the method including receiving a request to adjust the time of the clock, determining if the degree of requested adjustment summed with prior adjustments, if any, is within a limit, and permitting such a request if the degree of requested adjustment summed with prior adjustments, if any, is within the limit.

According to another aspect of the invention, a method of operating a free-running secure clock in a computing device is provided, the method including setting the clock to a time, receiving a request to adjust the time of the clock, determining if the degree of requested adjustment summed with prior adjustments, if any, is within a limit, and permitting such a request if the degree of requested adjustment summed with prior adjustments, if any, is within the limit.

According to another aspect of the invention, a free-running secure clock in a computing device is provided, the clock having been initially set to a time, wherein the clock, in response to a request to adjust its time, determines if the degree of requested adjustment summed with prior adjustments, if any, is within a limit and permits such a request if the degree of requested adjustment summed with prior adjustments, if any, is within the limit.

According to still another aspect of the invention, a free-running secure clock in a computing device is provided, wherein the clock has been initially set to a time, the clock including means for receiving a request to adjust the time of the clock, means for determining if the degree of requested adjustment summed with prior adjustments, if any, is within a limit, and means for permitting such a request if the degree of requested adjustment summed with prior adjustments, if any, is within the limit.

According to yet another aspect of the invention, a free-running secure clock in a computing device is provided, the clock including means for setting the clock to a time, means for receiving a request to adjust the time of the clock, means for determining if the degree of requested adjustment summed with prior adjustments, if any, is within a limit, and means for permitting such a request if the degree of requested adjustment summed with prior adjustments, if any, is within the limit.

DETAILED DESCRIPTION OF THE INVENTION

Figure 1:
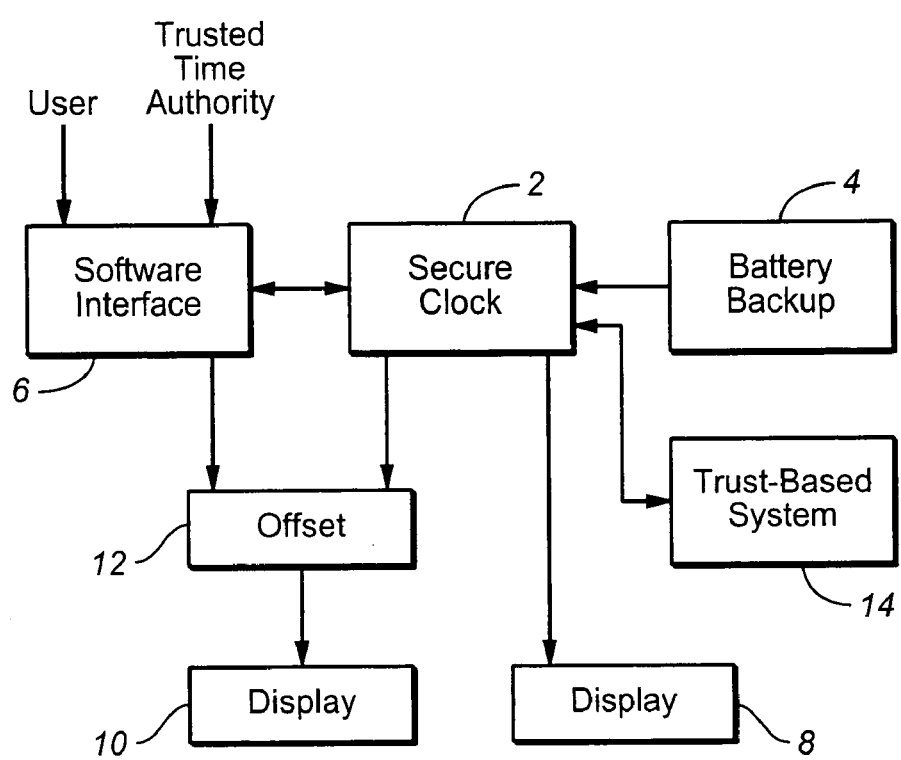
FIG. 1 is a schematic functional block diagram showing an arrangement embodying aspects of the present invention.

FIG. 1 shows a block diagram of an arrangement embodying aspects of the present invention. The arrangement may be considered to be incorporated within or associated with a computing device, including a digital content reproduction device and the like. A free-running real-time secure clock 2 has a battery backup system 4 and may be contained in or associated with a device having a trust-based system. The secure clock communicates with a software interface 6 that receives an initial time setting from a user or a trusted time authority and that receives subsequent time adjustments from a user. The software interface and clock may operate with any suitable special purpose or general-purpose computer that includes appropriate memory. The secure clock may provide, for example, one or two displays, each of which may be visual and/or aural. A first display 8 may convey either the time or both the time and date of the secure clock. A second display 10 may convey either the time or both the time and date of the secure clock offset in block 12 by an amount selected by a user via the software interface 6. An offset may be chosen that results a second display according to a local time zone. The offset 12 does not affect the time of the secure clock and is merely for the convenience of the user. The secure clock communicates with a trust-based system 14, which may be, for example, a DRM system.

Initially, the secure clock may be set, for example, to a trusted time by, for example, a trusted time authority external to the computing device. Alternatively, the clock may be set initially to a trusted time or some other time by a user of the computing device. Although the secure time may, in principle, be set to any time or time zone, it may be desirable to set it to a standard time or time zone employed by the trust-based system associated with the device. For example, if the device reproduces digital cinema content, such content may be standardized so as to have a digital rights license having time restrictions expressed in accordance with a particular time zone, such as Coordinated Universal Time (UTC).

Whether set by a user or a trusted time authority, once initially set, the clock is "locked" such that restrictions are imposed on further adjustments. The clock logs the initial setting "locked" time, which may be referred to as $T_{LOCKED}$.

Once the clock has been locked, when the clock receives a request to adjust its time, it determines if the degree of requested adjustment summed with prior adjustments, if any, is within a limit, and it permits such a request if the degree of requested adjustment summed with prior adjustments, if any is within the limit. Either the limit is a function of a predicted range of clock drift, or, alternatively, as explained below, a function of twice a predicted range of clock drift.

The predicted range of clock drift may be determined in any suitable way. For example, the predicted range of clock drift may be the worst-case drift of the RTC as determined from the tolerances of the components used in the clock. Such a calculation preferably should account for the operating and storage temperature ranges, with and without power applied to the computing device with which the clock is associated (it being understood that power is continuously applied to the RTC, whether or not the associated device is powered and operating). The tolerance may be denoted as $Tol_{XTAL}$. A typical tolerance may be in the range of 10-50 ppm.

The clock logs in memory all adjustment made since it was locked and it keeps a running sum of them since it was locked, $\Sigma T_{ADJUST}$. The clock may either have a long-term prediction of clock drift limits in memory or it may calculate the predicted clock drift limits at specific times when required. Whenever a user attempts an adjustment, the clock calculates the time elapsed since it was locked. Alternatively, the clock may continuously keep a running elapsed time. Every time an attempt is made to adjust the clock, the requested adjustment is added to the sum of all previous successful adjustments to determine if the requested adjustment taken with such prior adjustments are within the range of a predicted drift of the clock. The time correction is permitted if the absolute cumulative change (including the requested adjustment) is less than a prediction of the largest error that could have accumulated since the clock was locked due to clock drift.

For example, let the current time in the RTC be $T_{NOW}$ and the time that the user is attempting to set be $T_{REQUESTED}$. Preferably, the adjusted is permitted if and only if:

$$|\Sigma T_{ADJUST(PRIOR)} + T_{REQUESTED} - T_{NOW}| < (T_{NOW} - T_{LOCKED}) * Tol_{XTAL} \quad \text{Eqn. 1}$$

$(T_{NOW} - T_{LOCKED}) * Tol_{XTAL}$ may be considered to be the predicted clock drift. Since the drift may be positive or negative, the maximum positive and negative drift at any given time define a limit.

If the correction is allowed, then the clock permits the requested adjustment and it updates the prior cumulative adjustment $\Sigma T_{ADJUST(PRIOR)}$ with the new adjustment to provide an updated cumulative adjustment $\Sigma T_{ADJUST(UPDATED)}$:

$$\Sigma T_{ADJUST(UPDATED)} = \Sigma T_{ADJUST(PRIOR)} + T_{REQUESTED} - T_{NOW} \quad \text{Eqn. 2}$$

Note that the cumulative adjustment, $\Sigma T_{ADJUST}$, is the sum of the signed adjustments. Therefore, an adjustment in one direction is effectively cancelled by an adjustment of the same magnitude in the opposite direction.

If the requested adjustment would result in a cumulative adjustment greater than the clock drift, it is not allowed—the time is not adjusted and cumulative adjustment is not updated. Alternatively, a partial adjustment could be allowed up to the extent that the partially allowed adjustment and the prior cumulative adjustments do not exceed the clock drift limit. Allowance of such partial adjustments may be useful, for example, in an environment having two devices each with its own free-running RTC in which it is desired to synchronize the two RTCs to each other. Assuming that the RTCs were initially set to the same time reference, a user could attempt to set each to the other's time one after the other.

Figure 2:
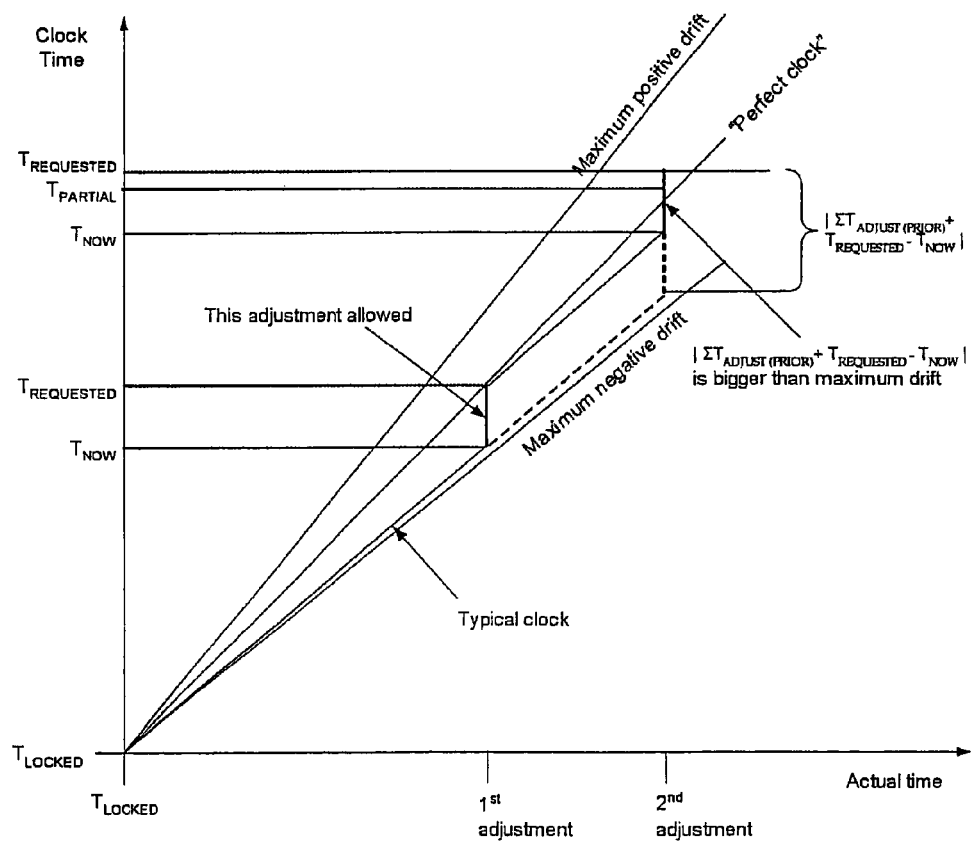
FIG. 2 is a plot of RTC time versus Actual time, illustrating an example of the secure clock operation in accordance with aspects of the present invention.

FIG. 2 illustrates an example of the above-described clock operation in accordance with aspects of the present invention. As shown by the forty-five degree line labeled "Perfect RTC," starting at $T_{LOCKED}$, the time of a perfect RTC (the vertical axis "RTC Time") is the same as the actual time. A predicted "Maximum positive drift" of the clock is shown by the so-labeled dashed line that emanates at $T_{LOCKED}$ and diverges upward, indicating an increasing positive divergence of the RTC Time (i.e., running faster) with respect to the Actual time. A corresponding predicted "Maximum negative drift" of the clock is shown by the so-labeled dashed line that emanates at $T_{LOCKED}$ and diverges downward, indicating an increasing negative divergence of the RTC Time (i.e., running slower) with respect to the Actual time. The maximum positive drift and maximum negative drift define a limit. The example of FIG. 1 assumes that the particular "Typical RTC" of this example has a negative drift as shown. Thus, at the time of a first adjustment request, as indicated on the Actual time axis as "$1^{st}$ adjustment", the RTC has an RTC Time labeled $T_{NOW}$. If the time requested ($T_{REQUESTED}$) by a user is the Actual time, then the absolute value of the adjustment requested is $|T_{REQUESTED} - T_{NOW}|$. Since this is the first adjustment request, there is no prior cumulative adjustment $\Sigma T_{ADJUST(PRIOR)}$ and it is sufficient that the absolute value of the adjustment requested is less than the maximum predicted clock drift, which it is, as my be seen in the figure. Thus, the first requested adjustment is allowed and $T_{REQUESTED}$ becomes the RTC time.

However, with increasing Actual time, the RTC time drifts negatively with respect to Actual time (the RTC runs slower), as shown. At the time of a second adjustment request, as indicated on the Actual time axis as "2nd adjustment," the RTC has an RTC Time labeled $T_{NOW}$. If the time requested (labeled $T_{REQUESTED}$) by a user is a time more advanced than the actual time, then the absolute value of the adjustment requested and the prior cumulative adjustment ($|\Sigma T_{ADJUST(PRIOR)} + T_{REQUESTED} - T_{NOW}|$) is greater than the maximum predicted clock drift, as may be seen in the figure. $\Sigma T_{ADJUST(PRIOR)}$ is illustrated as the dashed line extending vertically from the dashed line extension of the "Typical RTC" line (indicating the actual RTC drift had not the first adjustment been made). Thus, the second requested adjustment is not allowed and the RTC time remains $T_{NOW}$ at the time of the second request. Alternatively, as mentioned above, a partial adjustment could be allowed up to the extent that the partially allowed adjustment and the prior cumulative adjustments do not exceed the clock drift limit. In this example, an adjustment from $T_{NOW}$ up to TPARTIAL or less could be allowed without exceeding the clock drift limit.

Although, as shown in the figure, the allowable adjustment range grows with the age of the clock, during the typical life of a system (a few years), it can be made too small to be useful for the purposes of defeating DRM. Therefore, aspects of the present invention allow a user to adjust the clock to maintain accuracy while preventing illicit adjustments to defeat DRM.

In order to time synchronize a multiplicity of devices, a secure clock according to the present invention in an environment having multiple devices each with its own free-running RTC may be configured so as to allow adjustments to be made within twice a predicted range of drift. In such an arrangement, either all of the RTCs should be set initially at about the same time to the same external reference (whether or not set by a trusted authority to a trusted time) or the time of one of the RTCs may be used as a reference to whose time the other RTCs are set. Preferably, the "newest" RTC, the RTC having been set most recently to an external reference, is used as a reference to which the other RTCs are set.

IMPLEMENTATION

The programming necessary to effectuate the processes performed in connection with the present invention is relatively straightforward and should be apparent to the relevant programming public. Accordingly, such programming is not attached hereto. Any particular programming, then, may be employed to effectuate the present invention without departing from the spirit and scope thereof.

The invention may be implemented in hardware or software, or a combination of both (e.g., programmable logic arrays). Unless otherwise specified, the steps included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

We claim:

1. A method of operating a free-running secure clock, wherein the clock has been initially set to a time, comprising
receiving a request to adjust the time of the clock,
determining if the degree of requested adjustment summed with prior adjustments, is within a limit based on the time to which the clock was initially set, and
for all requests to adjust the time of the clock, permitting such a request if the degree of requested adjustment summed with prior adjustments is within the limit.

2. A method according to claim 1 wherein said limit is a function of a predicted range of clock drift with respect to the time to which the clock was initially set.

3. A method of operating a free-running secure clock, comprising
setting the clock to an initial time,
receiving a request to adjust the time of the clock,
determining if the degree of requested adjustment summed with prior adjustments is within a limit based on the time to which the clock was initially set, and
for all requests to adjust the time of the clock, permitting such a request if the degree of requested adjustment summed with prior adjustments is within the limit.

4. A method according to claim 3 wherein said limit is a function of a predicted range of clock drift with respect to the time to which the clock was initially set.

5. The method of claim 3 or claim 4 wherein the time to which the clock was initially set is a time provided by a user.

6. The method of claim 3 or claim 4 wherein the time to which the clock was initially set is trusted time provided by a trusted time authority.

7. A free-running secure clock, the clock having been initially set to a time, wherein the clock, in response to a request to adjust its time determines if the degree of requested adjustment summed with prior adjustments is within a limit based on the time to which the clock was initially set and, for all requests to adjust the time of the clock, permits such a request if the degree of requested adjustment summed with prior adjustments is within the limit.

8. The free-running secure clock of claim 7 wherein said limit is a function of a predicted range of clock drift with respect to the time to which the clock was initially set.

9. A free-running secure clock, wherein the clock has been initially set to a time, comprising
means for receiving a request to adjust the time of the clock,
means for determining if the degree of requested adjustment summed with prior adjustments is within a limit based on the time to which the clock was initially set, and means for permitting, for all requests to adjust the time of the clock, such a request if the degree of requested adjustment summed with prior adjustments is within the limit.

10. A free-running secure clock according to claim 9 wherein said limit is a function of a predicted range of clock drift with respect to the time to which the clock was initially set.

11. A free-running secure clock, comprising
means for setting the clock to a time,
means for receiving a request to adjust the time of the clock,
means for determining if the degree of requested adjustment summed with prior adjustments is within a limit based on the time to which the clock was initially set, and
means for permitting, for all requests to adjust the time of the clock, such a request if the degree of requested adjustment summed with prior adjustments is within the limit.

12. A free-running secure clock according to claim 11 wherein said limit is a function of a predicted range of clock drift with respect to the time to which the clock was initially set.

13. The free-running secure clock of claim 11 or claim 12 wherein the time to which the clock was initially set is a time provided by a user.

14. The free-running secure clock of claim 11 or claim 12 wherein the time to which the clock was initially set is trusted time provided by a trusted time authority.

15. An apparatus comprising hardware that performs the methods of any one of claims 1 through 4.

16. A computer program, stored on a computer-readable medium for causing a computer to perform the methods of any one of claims 1 through 4.

* * * * *